United States Patent Office 3,546,281
Patented Dec. 8, 1970

3,546,281
METHOD OF PRODUCING NOVEL POLYENE COMPOUND
Hans Heinz Haeck and Teunis Kralt, Van Houtenlaan, Weesp, Netherlands, assignors, by mesne assignments, to U.S. Philips Corporation, New York, N.Y., a corporation of Delaware
No Drawing. Filed Mar. 31, 1967, Ser. No. 627,316
Claims priority, application Netherlands, Apr. 1, 1966, 6604324
Int. Cl. C07c 61/22
U.S. Cl. 260—514
10 Claims

ABSTRACT OF THE DISCLOSURE

Prepare polyene derivatives such as β-carotene-dicarboxylic acid -14,15 and γ-carotene-dicarboxylic acid -10',11' and estesr thereof. The compounds are useful for food coloring. This abstract is not intended to be a description of the invention defined by the claims.

The invention relates to a method of producing novel polyene compounds suitable for use as starting product for preparing natural colouring substances.

Owing to the growing prosperity the consumer is more inclined to pay a higher price for nutrients and luxuries of more attractive appearance. Therefore there is a growing demand for colouring substances capable of enhancing the appearance of such matter. The choice of colouring substances is considerably restricted, since legal prescriptions involve severe requirements for these substances. Only those compounds can be considered for use which have proved not to have a harmful effect on the human or animal organism, even after having been consumed for a long time. This could be proved true for colouring substances found by nature in nutrients, so that they are employed on a large scale, even to an extent such that the natural resources have proved not to be sufficient, so that synthetic processes had to be designed.

One of the most important colouring substances is β-carotene, which substance is especially added to margarine and mayonnaise. Reference may furthermore be made to zeaxanthine and xanthophyll. These compounds are particularly used in hen's fodder for eliminating the pale colour of meat and yolk.

The invention relates to a method of producing novel polyene compounds of the Formula I,

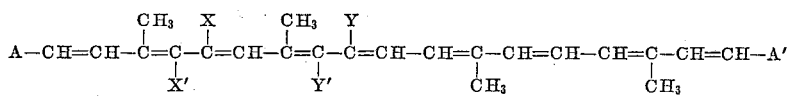

wherein X, X', Y and Y' are each moieties selected from the group consisting of hydrogen, carboxyl, salts of said carboxyl and esters of said carboxyl, with alcohols of 1 to 4 carbon atoms with the proviso that X and X' are hydrogen only when Y and Y' are moieties other than hydrogen and Y and Y' are hydrogen when X and X' are moieties other than hydrogen, A and A' each are moieties selected from the group consisting of compounds of the formulae

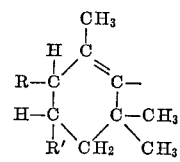

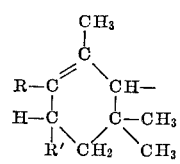

and

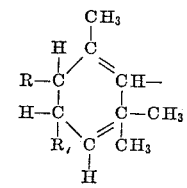

wherein R and R' are each moieties selected from the group consisting of hydrogen, hydroxy, methoxy and ethoxy, with the proviso that at least one of the moieties R and R' is hydrogen. From these compounds may be obtained inter alia said carotinoid colouring substances by replacing the carboxyl groups represented by either X and X' or Y and Y' by hydrogen atoms.

The compounds of the Formula I, in which X and X' represent a carboxyl-group may themselves be employed as colouring substances. They have a yellow to orange colour. Especially the esters may be employed as fat-soluble colouring substances, whilst particularly triethanol amine salts may be employed as water-soluble colouring substances, for which there is a great need.

The method is characterized in that a compound of the Formula III

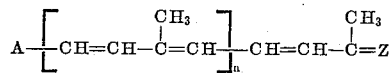

is reacted, in the presence of a condensing agent, with a compound of the Formula IV

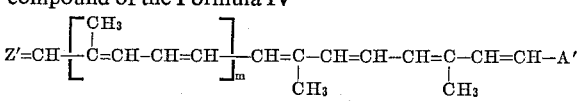

and in that the resultant half ester is saponified for the production of the corresponding diacid or diacid salt, or is esterified for the production of a diester.

In the Formulae III and IV A and A' have the same meanings as in Formula I, whilst $m$ and $n$ may be 0 or 1, on the understanding that their sum is 1; Z in Formula III is either a double-bonded oxygen atom, in which case Z' of Formula IV is a group of Formula V

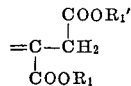

or a group of the Formula V, in which case Z' is a double-bonded oxygen atom. In Formula V $R_1$ and $R'_1$ are an alkyl-group having 1 to 4 carbon atoms.

The reaction is preferably carried out with those compounds of the Formula III in which Z is a group of the Formula V, it being preferred, in particular, to use one of the groups in which $R_1$ and $R'_1$ represent methyl, ethyl or t-butyl and compounds of the Formula IV in which Z' is a double-bonded oxygen atom.

Suitable condensing agents are, for example, sodium hydride, and alcoholates such as sodium ethanolate, potassium methanolate, sodium methanolate and potassium t-butanolate, but potassium t-butanolate and sodium methanolate are preferred.

The reaction mixture may be diluted with a suitable solvent. Reference may be made to benzene, diethylether, alcohols such as ethanol and t-butanol.

If the reaction is carried out with a keto-compound of the Formula III, this substance is dripped into the reaction mixture for eliminating side reactions as far as possible.

The compounds of the Formulae III and IV, in which Z and Z' represent the group of the Formula V are novel. They may be obtained by reacting a succinic acid diester in the presence of one of the aforesaid condensing agents with a compound of the Formulae III and IV, respectively, in which Z and Z' represent a double-bonded oxygen atom, whilst the free carboxyl-group of the resultant half-ester is esterified. This may be carried out with dimethyl- or diethyl-sulphate or an alkyl-iodide in the presence of an acid binder such as potassium carbonate.

For the production of the succinic acid derivatives of the Formula III the ketones of Formula III are preferably dripped into an excess quantity of succinic acid diester. In this case potassium t-butanolate is preferred as a condensing agent.

The method according to the invention for the production of β-carotene has the further advantage that oxo-compounds, which may be used as a starting material, for example β-ionone and retinal, are obtained as intermediate products in vitamin A syntheses or can be readily produced therefrom.

The following examples illustrate the method according to the invention.

(1A) 9 - (2',6',6' - trimethylcyclohexene - 1'-yl-1')-2-carboxy - 3.7 - dimethyl - nonatetraene-2,4,6,7-carboxylic acid-1.—To a solution of potassium t-butanolate (made from 10.9 gs. (0.28 g. at.) of potassium and 250 mls. of dry t-butanol) was added 69.6 gs. (0.477 mol) of dimethylsuccinate. After stirring for half an hour this mixture received at room temperature in a nitrogen atmosphere in drops a solution of 49.1 gs. (0.19 mol) of 8-(2',6',6' - trimethylcyclohexene-1'-yl-1')-6-methyl-octatriene-3,5,7-one-2 in 150 mls. of dry t-butanol within six hours. After stirring again for half an hour, the mixture was poured out on 1.5 litres of glacial water. The mixture was acidified with 180 mls. of 2 N hydrochloric acid and extracted with petroleum-ether. The extract was washed with water and evaporated to dryness after drying. The residue (128 gs.) was dissolved in 900 mls. of methanol. This solution was refluxed, after which a solution of 80 gs. of potassium hydroxide in 750 mls. of water was added. This mixture was boiled for four hours. After cooling it was diluted with 1.6 litres of glacial water and extracted, for removing the neutral fraction, with petroleum-ether. Then the mixture was acidified with 130 mls. of concentrated hydrochloric acid, after it was extracted with ether. The ether extract was thoroughly washed with water and evaporated to dryness after drying. Yield 47.6 gs. (70%). This fairly pure product may be further purified by recrystallisation from a mixture of benzene and ethanol. Melting point 155–157° C. (decomposition). Spectrum $a_1'$ (339 nm.)=1490 (in alkaline methanol) and $a_1'$ (350 nm.)=1230 (in acidic methanol).

(1B) Dimethylester of 1A.—A mixture of 10.74 gs. (0.03 mol) of 1A, 9 gs. (0.072 mol) of dimethylsulphate, 9.9 gs. (0.072 mol) of anhydrous potassium carbonate and 150 mls. of acetone was refluxed for two and a half hours. The mixture was cooled and 15 mls. of 25% ammonia was added, after which the mixture was stirred for one hour. The mixture was poured out on 600 mls. of water and extracted with petroleum-ether. The extract was washed with water, dried and evaporated to dryness. Yield 10.84 gs. (94%). Spectrum $\alpha_1'$ (354 nm.)=995 (methanol).

(1C) β-carotene-dicarboxylic acid-14,15.—23.58 gs. (0.061 mol) of 1B and 17.3 gs (0.061 mol) of retinal were dissolved in 120 mls. of absolute ethanol. Whilst stirring and cooling in ice, a sodium ethanolate solution was dripped in within half an hour (produced from 2.8 gs. (0.122 g. at.) of sodium and 70 mls. of absolute ethanol). After further stirring at 0° C. for half an hour, the mixture was stirred at 20° C. for one hour and at boiling temperature for another hour. A solution of 12 gs. of potassium hydroxide in 60 mls. of water and 120 mls. of ethanol was added to the boiling mixture, which was subsequently boiled for two hours. The mixture was cooled and 100 mls. of ether was added, the mixture being then poured out on 1 litre of glacial water. The mixture was then acidified with 150 mls. of 2 N hydrochloric acid and extracted wtih ether. The extract was washed with water, dried and evaporated to dryness. The residue was recrystallised from a mixture of 40 mls. of ether and 200 mls. of petroleum-ether. The compound crystallised out slowly. Yield 28.8 gs. (76%). Melting point 148–150° C. (decomposition). Spectrum $a_1'$ (339 nm.)=1140; $a_1'$ (390 nm.)=925 (alkaline ethanol); $a_1'$ (351 nm.)=975; $a_1'$ (400 nm.)=890 (acidic ethanol).

(2A) 5 - (2',6',6' - trimethylcyclohexene - 1' - yl - 1')-2 - carboxyl - 3 - methyl - pentadiene - 2,4 - carboxylic acid-1.—To a solution of potassium t-butanolate (produced from 10.9 gs. (0.28 g. at.) of potassium and 250 mls. of t-butanol) was added 58.4 gs. (0.4 mole) of dimethylsuccinate. This mixture was stirred for half an hour, after which a mixture of 38.4 gs. (0.2 mol) of β-ionone and 150 mls. of t-butanol was added within about 5 hours in drops. The mixture was stirred again for half an hour and then poured out on 1.5 litres of glacial water, after which it was acidified with 40 mls. of concentrated acid. This mixture was extracted with petroleum-ether. The extract was washed with water, dried and evaporated to dryness. The residue (73 gs.) was dissolved in 500 mls. of methanol. This solution was refluxed and to the boiling solution was added a solution of 90 gs. of potassium hydroxide in 250 mls. of water, after which the mixture was boiled for 3 hours. After cooling it was poured out on 0.5 litre of glacial water and the neutral fraction was extracted with petroleum-ether. This mixture was then acidified with 145 mls. of concentrated hydrochloric acid and extracted with ether. The ether extract was thoroughly washed with water, dried and evaporated to dryness. Yield 43.5 gs. (75%). This noncrystalline product was substantially pure. By dissolving it in benzene and by adding petroleum-ether, the compound crystallized out slowly. Melting point 126–128° C. Spectrum $a_1'$ (275 nm.)=560 (alkaline ethanol); $a_1'$ (294 nm.)=440 (acidic ethanol).

(2B) Dimethylester of 2A.—The esterification of 2A was carried out in a similar manner as described for the production of 1B. Yield 85%. Spectrum $a_1'$ (297 nm.)= 385 (ethanol).

(2C) β-carotene-dicarboxylic acid-10-11.—To a mixture of 3.5 g. (0.01 mol) of 12′-apo-β-carotenal, 3.2 g. (0.01 mol) of 2B and 20 mls. of absolute ethanol was added within half an hour. whilst cooled in ice, sodium ethanolate solution (produced from 0.46 g. of sodium and 10 mls. of absolute ethanol) in drops. Then the mixture was stirred for half an hour at 0° C., one hour at 20° C. and for one hour at boiling temperature, after which a solution of 2 gs. of potassium hydroxide in 10 mls. of water and 20 mls. of ethanol was added. This mixture was refluxed for one hour. After cooling 100 mls. of petroleum-ether was added and the mixture was poured out in 300 mls. of water. The water layer with the flocculent precipitate was separated out and acidified with 50 mls. of 2 N hydrochloric acid and shaken with ether. The ether solution was washed with water dried and evaporated to dryness. The residue had a weight of 5.8 gs. (93%) and was fairly pure dicarboxylic acid. By recrystallisation from a mixture of ether and petroleum-ether it could be further purified. Melting point 193 to 195° C. (decomposition). Spectrum: $a_1'$ (423 nm.)= 1580 (alkaline methanol); $a_1'$ (438 nm.)=1375 (acidic methanol).

(3A) 5 - (4′ - methoxy - 2′,6′,6′ - trimethylcyclohexene-1′ - yl - 1′) - 2 - carboxy - 3 - methylpentadiene - 2,4-carboxylic acid-1.—This compound was produced from 4-methoxy-β-ionone and dimethylsuccinate in a similar manner as described for the compound 2A. Yield 53%. Melting point 163–164° C. (decomposition). Spectrum $a_1'$ (273 nm.)=550 (alkaline ethanol); $a_1'$ (288 nm.)= 455 (acidic ethanol).

(3B) Dimethylester of 3A.—The esterification of 3A was carried out in quite the same manner as described for the production of 1B. Yield 89%. Spectrum $a_1'$ (293 nm.)=380 (methanol).

(3C) 3 - methoxy - β - carotene - dicarboxylic acid-10,11.—This compound was produced from 3B in quite the same manner as described for the production of 2C from 2B. Yield 95%. Melting point 135–140° C. (decomposition). Spectrum $a_1'$ (423 nm.)=1260 (alkaline methanol); $a_1'$ (435 nm.)=1095 (acidic methanol).

(4A) 2 - carboxyl - 3,7,11 - trimethyl - dodecatetraene-2,4,6,10 - carboxylic acid-1.—This compound was produced from pseudo-ionone and dimethylsuccinate in quite the same manner as described for the compound 2A. Yield 38%. Melting point 161–164° C. (decomposition). Spectrum $a_1'$ (293 nm.)=1440 (alkaline ethanol); $a_1'$ (310 nm.)=1200 (acidic ethanol).

(4B) Dimethylester of 4A.—The esterification of 4A was carried out in the manner described for the production of 1B. Yield 100%. Spectrum $a_1'$ (313 nm.)=955 (ethanol).

(4C) γ - carotene - dicarboxylic acid - 10′,11′.—This compound was produced from 4B in quite the same manner as described for the production of 2C from 2B. Yield 93%. Melting point 157–159° C. (decomposition). Spectrum $a_1'$ (295 nm.)=670; $a_1'$ (424 nm.)=1380 (alkaline methanol); $a_1'$ (316 nm.)=650 and $a_1'$ (437 nm.)=1180 (acidic methanol).

What is claimed is:

1. A polyene compound of the formula

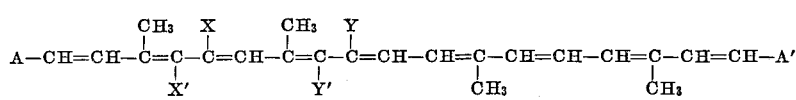

wherein X, X′, Y and Y′ are each moieties selected from the group consisting of hydrogen and carboxyl with the proviso that X and X′ are hydrogen only when Y and Y′ are moieties other than hydrogen and Y and Y′ are hydrogen when X and X′ are moieties other than hydrogen, A and A′ are each moieties selected from the group consisting of radicals of the formulae

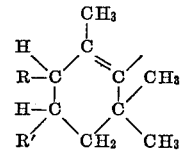

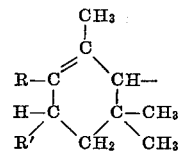

and

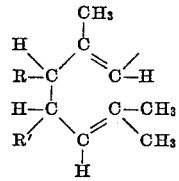

wherein R and R′ are each moieties selected from the group consisting of hydrogen, hydroxy, methoxy and ethoxy, with the proviso that at least one of the moieties R and R′ is hydrogen.

2. A compound of claim 1 wherein X and X′ are each moieties other than hydrogen.

3. A compound of claim 1 wherein A and A′ are each a moiety of the formula

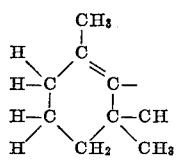

4. A compound of claim 1 wherein A and A′ are each a moiety of the formula

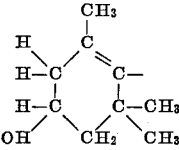

5. A compound of claim 1 wherein A and A′ are each a moiety of the formula

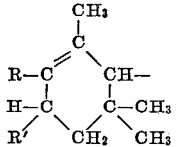

6. A compound of claim 1 wherein A and A' are each a moiety of the formula

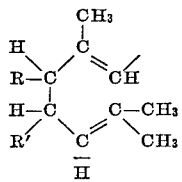

7. A compound of claim 1 said compound being β-carotene-dicarboxylic acid-14,15.
8. A compound of claim 1 said compound being β-carotene-dicarboxylic acid-10,11.
9. A compound of claim 1 said compound being 3-methoxy β-carotene-dicarboxylic acid-10,11.
10. A compound of claim 1 said compound being γ-carotene-dicarboxylic acid-10',11.

References Cited

UNITED STATES PATENTS 3,356,700  12/1967  Sarnecki _____ 260—410.9

FOREIGN PATENTS 88,671  3/1960  Denmark _____ 260—468

LORRAINE A. WEINBERGER, Primary Examiner

P. J. KILLOS, Assistant Examiner

U.S. Cl. X.R.

99—148; 260—468, 484, 485, 501.17, 535, 537

UNITED STATES PATENT OFFICE
CERTIFICATE OF CORRECTION

Patent No. 3,546,281 (PHN 1536)   Dated   December 8, 1970

Inventor(s) HANS HEINZ HAECK ET AL

It is certified that error appears in the above-identified patent and that said Letters Patent are hereby corrected as shown below:

Column 7, lines 3-9, change the formula to read as follows:

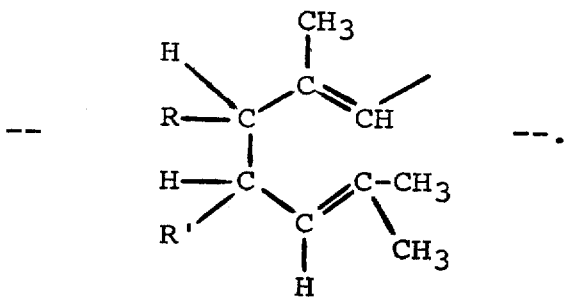

Column 8, line 2, change "11" to -- 11' --.

Signed and sealed this 4th day of January 1972.

(SEAL)
Attest:

EDWARD M. FLETCHER, JR.
Attesting Officer

ROBERT GOTTSCHALK
Acting Commissioner of Patents